United States Patent
Koennings et al.

(10) Patent No.: US 10,360,812 B2
(45) Date of Patent: Jul. 23, 2019

(54) CONTROLLING MULTI-FUNCTION COOKING APPARATUSES

(71) Applicant: Vorwerk & Co. Interholding GmbH, Wuppertal (DE)

(72) Inventors: Maximilian Koennings, Zurich (CH); Maria Jose Resende, Lisbon (PT); Georg Hackert, Bochum (DE); Julius Ganns, Wuppertal (DE); Stefan Hilgers, Essen (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 68 days.

(21) Appl. No.: 15/645,703

(22) Filed: Jul. 10, 2017

(65) Prior Publication Data

US 2018/0018903 A1    Jan. 18, 2018

(30) Foreign Application Priority Data

Jul. 15, 2016    (EP) ..................... 16179631

(51) Int. Cl.
*G05B 15/00*    (2006.01)
*G09B 19/00*    (2006.01)
(Continued)

(52) U.S. Cl.
CPC .......... *G09B 19/0092* (2013.01); *A47J 27/62* (2013.01); *A47J 36/32* (2013.01); *G06F 8/36* (2013.01); *G09B 5/02* (2013.01); *G09B 5/04* (2013.01)

(58) Field of Classification Search
CPC .................................................. G05D 19/02
(Continued)

(56) References Cited

U.S. PATENT DOCUMENTS 6,274,847 B1 * 8/2001 Hlava ................... A47J 27/004
219/432
6,789,067 B1 * 9/2004 Liebenow ............ G06Q 10/087
705/15

(Continued)

FOREIGN PATENT DOCUMENTS

WO    2015195575 A1    12/2015

OTHER PUBLICATIONS

European Search Report issued in EP Application No. 16179631.3 dated Mar. 8, 2017, 10 pages.

*Primary Examiner* — Suresh Suryawanshi
(74) *Attorney, Agent, or Firm* — Brake Hughes & Bellermann LLP

(57) ABSTRACT

Control system, method, and computer program product for partitioning machine readable recipe programs to control one or more multi-function cooking apparatuses for processing one or more food products. The system may include recipe program interface configured to receive one or more separate recipe programs for preparing food products. A partitioning module is configured to identify, in accordance with predefined partitioning rules, subsets of recipe program instructions in the one or more recipe programs. A first subset includes recipe program instructions for executing food processing steps with compatible ingredient information at temperatures below a predefined temperature threshold and a second subset includes recipe program instructions for executing food processing steps with compatible ingredient information at temperatures equal to or above the predefined temperature threshold.

20 Claims, 7 Drawing Sheets

(51) Int. Cl.
  *G09B 5/02* (2006.01)
  *G09B 5/04* (2006.01)
  *A47J 36/32* (2006.01)
  *A47J 27/62* (2006.01)
  *G06F 8/36* (2018.01)

(58) Field of Classification Search
  USPC ........................................................ 700/280
  See application file for complete search history.

(56) References Cited

U.S. PATENT DOCUMENTS

| | | | |
|---|---|---|---|
| 8,583,648 B1 | 11/2013 | Majkowska | |
| 9,782,032 B2 * | 10/2017 | Lagerlof | A47J 27/62 |
| 2009/0164171 A1 | 6/2009 | Wold et al. | |
| 2013/0149679 A1 * | 6/2013 | Tokuda | G09B 19/0092 434/127 |
| 2013/0232180 A1 | 9/2013 | Grube et al. | |
| 2015/0294225 A1 * | 10/2015 | Takei | G06N 5/04 706/11 |
| 2016/0198883 A1 * | 7/2016 | Wang | A47J 27/08 426/231 |

* cited by examiner

501

| step | ingredient | text | code instructions |
|---|---|---|---|
| 1.1 | - 1 garlic clove<br>- 80g onions<br>- 1 carrot, cut in pieces | Place garlic clove, onions and carrot into mixing bowl and chop 3 sec/speed 5. Scrape down sides of mixing bowl with spatula | Time = 3 sec<br>Speed = 5 |
| 1.2 | - 30g butter | Add butter and sauté 3 min/120C/speed 1 | Time = 3 min<br>Temp = 120<br>Speed = 1 |
| 1.3 | - 500g tomatoes, cut into quarters<br>- 1 tsp salt<br>- 1 tsp dried oregano | Add tomatoes, salt and dried oregano and chop 5 sec/speed 5 | Time = 5 sec<br>Speed = 5 |
| ... | ... | ... | ... |

FIG. 5A

| step | ingredient | text | code instructions | P | HSE / CA |
|---|---|---|---|---|---|
| ... | ... | ... | ... | ... | ... |
| II.1 | - 2 garlic clove<br>- 160 g onions<br>- 1 carrot, cut in pieces | Place garlic clove, onions and carrot into mixing bowl and chop 3 sec/speed 5. Scrape down sides of mixing bowl with spatula | Time = 3 sec<br>Speed = 5 | II | 201 / 205 |
| II.2 | - 60 g butter | Add butter and sauté 3 min/120C/speed 1 | Time = 3 min<br>Temp = 120<br>Speed = 1 | II | 201 / 205 |
| II.3 | - 1000 g tomatoes, cut into quarters<br>- 2 tsp salt<br>- 2 tsp dried oregano | Add tomatoes, salt and dried oregano and chop 5 sec/speed 5 | Time = 7 sec<br>Speed = 5 | II | 201 / 205 |
| ... | ... | ... | ... | ... | ... |

FIG. 5B

CONTROLLING MULTI-FUNCTION COOKING APPARATUSES

CROSS-REFERENCE TO RELATED APPLICATION

This application claims priority to, and is a continuation of, EP16179631.3, filed on Jul. 15, 2016 and entitled "System and Method for Recipe Program Generation to Control one or more Multi-Function Cooking Apparatuses" the entirety of which is hereby incorporated by reference.

TECHNICAL FIELD

The present disclosure generally relates to cooking apparatuses, and more particularly, to operating one or more cooking apparatuses with recipe program instructions controlling functions of the one or more cooking apparatuses.

BACKGROUND

Cooking apparatuses (cooking devices) have become more and more intelligent in the recent past by integrating multiple functions into the apparatus. For example, modern cooking devices integrate functions, such as heating, mixing, boiling, pureeing, etc., in a single multi-function cooking device. A cooking device typically has to be operated with appropriate technical parameter settings (e.g., temperature settings, rotational speed settings, etc.) to ensure proper operation. Proper operation of a cooking device as used hereinafter refers to correct, safe and/or secure operation for producing reproducible cooking results with the cooking apparatus with regards to a particular food product. A reproducible cooking result of a particular food product is achieved when the particular food product is produced in a repeatable manner, in repetitions with quality/quantities within a predefined tolerance range. Such a food product may include multiple food components which may be served in one or more courses of a menu or set meal.

SUMMARY

Therefore, it is a problem to improve the efficiency of food processing for complex food products or multi-course menus when operating one or more multi-function cooking apparatuses with respective recipe programs. A "complex food product", as used herein, is a food product which includes multiple food components that need to be prepared separately because at least one food component includes ingredients which are not compatible with the ingredients of at least one further food component, and/or because the recipe program instructions relate to food processing steps with control parameter settings which are not compatible with the control parameter settings of food processing steps of the at least one further food component. For example, a multi-course menu can be seen as a complex food product. The efficiency of food processing has two aspects: the energy efficiency of the entire food processing method and the time efficiency of the food processing method. The energy efficiency is improved when the overall energy consumption by the food processing method is reduced for the preparation for the complex food product. The time efficiency is improved when the overall food processing time is reduced for the preparation for the complex food product. Food processing steps, as used herein, include all steps performed by a cooking apparatus which are performed in the context of the preparation of a food product or food component. This may also include cleaning steps which are necessary in case of subsequent food processing steps using ingredients which are incompatible with the ingredients of a preceding step. Alternatively, there may be a need that a subsequent food processing step employs a clean cooking apparatus as otherwise a cooking step might not reach the desired quality.

The above technical problem is solved by a control system for one or more multi-functional cooking apparatuses, a computer-implemented method for partitioning recipe programs and a corresponding computer program product as disclosed in the independent claims.

In one embodiment, a control system for partitioning machine readable recipe programs to control one or more multi-function cooking apparatuses for processing one or more food products includes a recipe program interface configured to receive one or more separate recipe programs for preparing one or more food products from a storage component. The one or more separate recipe programs include machine readable recipe program instructions configured to control functions of a particular multi-function cooking apparatus for executing food processing steps to prepare the one or more food products in accordance with the one or more separate recipe programs. In an example embodiment, each separate recipe program is associated with a food product or a menu course. In traditional execution mode, the particular cooking apparatus loads and processes the separate recipe programs one by one. That is, the recipe program which relates to a first course of the menu is processed first. Once the first course is prepared, the cooking apparatus loads and processes the second course separate recipe program until the second course is prepared, and so on.

However, the control system includes a partitioning module and a generator module which generates a combined recipe program with program partitions including program instructions of the separate recipe programs in a rearranged order. Thereby, the partitioning module can identify subsets of recipe program instructions in the one or more recipe programs in accordance with predefined partitioning rules. The predefined partitioning rules include rule sets to analyze the separated recipe programs with regards to the ingredients for the respective food components and the control parameters for the cooking apparatus to perform the corresponding food processing steps. A particular food processing step may process the same or similar ingredients like another food processing step. In this case, the food processing steps could be performed together or as a sequence because the ingredients of the first step are compatible with the ingredients of the second step. The information in a recipe program with regards to such compatible ingredients is referred to as "compatible ingredient information" hereinafter. For example, the predefined partitioning rules can be implemented as a hierarchical decision tree which is testing each program instruction of the separate recipe program regarding its potential to contribute to a reduced food processing time and/or a reduced energy consumption of the entire food preparation when the respective program instruction is rearranged in the combined recipe program. The partitioning module identifies at least a first subset including recipe program instructions for executing food processing steps with first compatible ingredient information, and it identifies at least a second subset including recipe program instructions for executing food processing steps with second compatible ingredient information. In other words, the partitioning module identifies subsets of program instructions as building blocks for recipe program partitions of the combined recipe program wherein the subsets include program instructions associated with food processing steps which use the same or similar (compatible) ingredients. When grouping food processing steps in the subsets for the combined recipe program in accordance with the ingredients, the food processing time is reduced because food processing steps using compatible ingredients are combined and unnecessary bowl cleaning steps in between are eliminated.

In one embodiment, the recipe program instructions of the at least first subset relate to food processing steps performed at one or more temperatures in a first temperature range, and the recipe program instructions of the at least second subset relate to food processing steps performed at one or more temperatures in a different second temperature range. For example, the recipe instructions of the first subset may include temperature control parameters with temperatures below a predefined temperatures threshold (e.g., cool steps) and the recipe instructions of the second subset may include temperature control parameters with temperatures equal to or greater than the predefined temperature threshold (e.g., warm steps). Multiple thresholds may be defined to separate more than two temperature ranges. When grouping food processing steps in the subsets for the combined recipe program in accordance with the temperature control parameters, heating or cooling cycles can be avoided which has a positive impact on the overall energy balance (performance) of the food processing operation and saves energy.

The generator module is configured to generate the combined recipe program with recipe program instructions covering all food processing steps associated with the one or more separate recipe programs wherein the combined recipe program has at least a first partition comprising the at least first subset, and has at least a second partition comprising the at least second subset. In other words, the first and second partitions group such recipe instructions of the original separate recipe programs which relate to the same or similar ingredients and/or which are associated with the same or similar control parameters (e.g., similar temperature, similar cooking time, similar rotational speed, etc.).

The partitions of the combined recipe program are then provided through the recipe program interface to the one or more multi-function cooking apparatuses for execution. In case of using a single cooking apparatus, the entire combined recipe program is provided to this cooking apparatus and the partitions are executed in the order they are included in the combined recipe program. It may be advantageous for the overall energy balance of the combined recipe program execution to first execute those partitions which include the subsets with control parameters at lower temperatures. In embodiments, where the control system is an integrated component of a particular multi-function cooking apparatus (e.g., a master device), one or more of the partitions may be provided to a recipe execution engine of the master device itself, whereas other partitions can be distributed to one or more further multi-function cooking apparatus(es) (e.g., slave devices).

In one embodiment, the generator module may add, in accordance with the predefined partitioning rules, one or more transitioning recipe instructions to the first and/or second partition wherein a particular transitioning recipe instruction is determined based on a comparison of the one or more separate recipe programs with the partitions of the generated combined recipe program. For example, the regrouping of recipe instructions from the original separate recipe programs may result in the consolidation of one or more food processing steps of the first separate program and the second separate program. In other words, when preparing for example a starter and a main course, the respective separate programs may include similar or identical food processing steps (i.e., similar or identical control parameters are applied to similar or identical ingredients). Such steps may be consolidated into a single set of program instructions in the combined recipe program applied to the combined amount of compatible ingredients (from the first and second separate programs) where the control parameters are adjusted accordingly by the partitioning module. For example, dependent on the ingredients the cooking time may remain constant (e.g., when preparing rice) or it may be extended (e.g., when preparing a tomato puree where the increase amount of tomatoes may employs a longer cooking time). In cases, where a combined recipe program step leads to an amount of a prepared food component from which only a portion is needed to continue with the combined recipe program whereas the remaining portion is needed at a later stage of the combined program, the generator module may insert a program instruction that the portion used at a later stage may be persevered in a separate container before continuing with the combined recipe program execution.

In another embodiment, similar to the previous embodiment, the generator module may remove one or more original separate recipe instructions from the first and/or second partition in accordance with the predefined partitioning rules. For example, in case similar sets of recipe instructions in the separate recipe programs can be consolidated into a single set of recipe instructions of the combined recipe program then one set of the original separated recipe program instructions can be completely removed and is not included in the partitions of the combined program anymore.

In one embodiment, the generator module can merge a plurality of recipe program instructions of the one or more separate recipe programs with compatible ingredient information into a single recipe program instruction of the combined recipe program. For example, the merged single recipe program instruction of the combined recipe program can include a food processing time control parameter adjusted in accordance with one or more predefined adjustment rules.

In one embodiment, the particular cooking apparatus may be equipped with two or more heating-and-stirring elements which can be alternatively mounted on the cooking apparatus. For example, the cooking apparatus may register the available equipment with the control system so that the control system is aware about the multiple heating-and-stirring elements. In this embodiment, the partitioning module may take into account that various partitions of the combined recipe program may be assigned to different heating-and-stirring elements. For example, the partitions including the cool steps may be assigned to a first heating-and-stirring element and the partitions including the warm steps may be assigned to a second heating-and-stirring elements. Other considerations may determine the assignment of a particular partition to a particular heating-and-stirring element. For example, rinsing or cleaning steps may be avoidable when using different heating-and-stirring elements for different food components which include incompatible ingredients. The assignment of a particular partition to a particular heating-and-stirring element is provided to the cooking apparatus together with the combined recipe program so that the cooking apparatus will execute a first partition with at least a first heating-and-stirring element and a second partition with at least a second heating-and-stirring element. The generator module may insert transitioning instructions indicating the need to change the heating-andstirring elements mounted on the cooking apparatus after the appropriate food processing steps.

In one embodiment, multiple multi-function cooking apparatuses may be used for jointly processing the food preparation of a complex food product or menu. In this embodiment, the available cooking apparatus may register with the control system so that the control system is aware of the available equipment. In this embodiment, parallel cooking can be enabled by parallelizing the execution of recipe programs steps which can be performed independently. Independent performance of cooking steps is possible when a first sequence of consecutive recipe program instructions has no immediate impact on a second sequence of consecutive recipe program instructions. For example, the program instructions for a dessert course will likely not interfere with program instructions for a starter course. Therefore, the respective partitions of the combined recipe program may be executed in parallel on two registered cooking apparatuses which reduces the overall food processing time of the combined recipe program. In this embodiment, the partitioning module assigns each identified partition of the combined recipe program to a registered cooking apparatus. The generated partitions are then deployed through the recipe program interface to corresponding cooking apparatus for execution according to the assignment(s). This embodiment may be combined with the previous embodiment in that for each of the registered cooking apparatuses one or more heating-and-stirring elements may be registered with the control system. In this case, the partitions may be assigned to pairs of cooking apparatus and heating-and-stirring element so that a particular cooking apparatus may receive one or more partitions of the combined recipe program which make use of one or more heating-and-stirring elements of this cooking apparatus.

In an alternative embodiment, a computer-implemented method is provided for partitioning machine readable recipe programs for one or more multi-function cooking apparatuses for processing one or more food products. The method can be executed by the control system. The method includes: receiving, from a storage component, one or more separate recipe programs for preparing one or more food products wherein the one or more separate recipe programs include machine readable recipe program instructions configured to control functions of a particular multi-function cooking apparatus for sequentially executing food processing steps to prepare the one or more food products in accordance with the one or more separate recipe programs; in accordance with predefined partitioning rules using at least account temperature control parameters of particular recipe program instructions and ingredient information associated with the particular recipe program instructions, identifying, by a program analyzer component, subsets of recipe program instructions in the one or more recipe programs wherein at least a first subset includes recipe program instructions for executing food processing steps with first compatible ingredient information, and at least a second subset includes recipe program instructions for executing food processing steps with second compatible ingredient information; generating a combined recipe program with recipe program instructions covering all food processing steps associated with the one or more separate recipe programs wherein the combined recipe program has at least a first partition comprising the at least first subset, and has at least a second partition comprising the at least second subset; and providing the first and second partitions to the one or more multi-function cooking apparatuses for execution.

In one embodiment, the recipe program instructions of the at least first subset relate to food processing steps performed at one or more temperatures in a first temperature range, and the recipe program instructions of the at least second subset relate to food processing steps performed at one or more temperatures in a different second temperature range.

In one embodiment, the method further includes adding, in accordance with the predefined partitioning rules, one or more transitioning recipe instructions to the first and/or second partition wherein a particular transitioning recipe instruction is determined based on a comparison of the one or more separate recipe programs with the partitions of the generated combined recipe program.

In one embodiment, the method further includes removing, in accordance with the predefined partitioning rules, one or more original separate recipe instructions from the first and/or second partition wherein a particular original separate recipe instruction is determined based on a comparison of the one or more separate recipe programs with the partitions of the generated combined recipe program.

In one embodiment, the first and second partitions are provided to the particular cooking apparatus and the first partition is to be executed with at least a first heating-and-stirring element of the particular cooking apparatus, and the second partition is to be executed with at least a second heating-and-stirring element of the particular multi-function cooking apparatus.

In one embodiment, the first partition is provided to the particular multi-function cooking apparatus be executed with at least a first heating-and-stirring element of the particular multi-function cooking apparatus, and the second partition is provided to a further multi-function cooking apparatus to be executed with at least a second heating-and-stirring element of the further multi-function cooking apparatus. In this embodiment, the program analyzer can use predefined partitioning rules to determine dependencies between food processing steps in that some food processing steps may prepare a food component which is used as input for further food processing steps. The combined recipe program can then be partitioned in that a first partition includes recipe program instructions configured to complete processing of a particular food component before the execution of a further partition starts on the further multi-function cooking apparatus wherein the further multi-function cooking apparatus uses the particular food component as an input. This ensures proper synchronization of the food processing steps when executed in a distributed environment with more than one multi-function cooking apparatus where parallel execution is enabled.

The predefined partitioning rules further include rules to re-arrange food processing steps so that the re-arranged food processing steps reduce the aggregated energy consumption for the preparation of the one or more food products when operating the one or more multi-function cooking apparatuses at different temperatures. This is achieved by grouping and consolidating recipe program instructions of the original separate recipe programs for compatible ingredients in the combined recipe program dependent on their temperature control parameter settings.

Cleaning/rinsing steps of the heating-and-stirring element(s) are consuming additional resources in terms of food processing time, water consumption and energy consumption (in case the cleaning is performed at elevated temperatures). Therefore, in one embodiment, the method further allows to reduce the number of cleaning steps required by the combined recipe program versus the separate programs. In this embodiment, the program analyzer analyzes the partitions for recipe instructions related to cleaning steps of the original separate recipe programs and rearranges food preparation steps of the combined recipe program to eliminate at least one of the original recipe instructions related to a cleaning step.

In a further embodiment, computer program instructions may be stored on a computer readable medium forming a computer program product which can be loaded into a memory of the control system and executed by one or more processors of the control system to execute the previously disclosed method and perform the functions of the previously disclosed control system.

Further aspects of the disclosed subject matter will be realized and attained by means of the elements and combinations particularly depicted in the appended claims. It is to be understood that both the foregoing general description and the following detailed description are exemplary and explanatory only, and are not restrictive of the disclosure as described.

In some embodiments, functions of multi-functional cooking apparatuses are controlled by one or more recipe programs which have instructions that are sequentially executed to arrive at the prepared food product or menu. For example, a separate recipe program is loaded into the cooking apparatus for separately preparing each course of the menu and the courses are prepared by processing the separate recipe programs in the corresponding sequence.

Some multi-functional cooking apparatuses are equipped with more than one heating-and-stirring element wherein, of course, only one heating-and-stirring element at a time can be mounted to the cooking apparatus. That is, only sequential processing of the recipe instructions is possible even with multiple heating-and-stirring elements available. Nevertheless, using more than one heating-and-stirring element with a cooking apparatus according to the predefined recipe program may result in a less efficient food processing method than possible with the available equipment. An example of a heating-and-stirring element is a bowl with a heating plate at its bottom and a stirring element driven by a motor of the cooking apparatus. A heating-and-stirring element, as used herein, may also be an assembly of a heating element and a stirring element. It is not necessary that the two elements form a single component. They may be separate elements which are used together with the cooking apparatus to perform the heating and stirring functions, respectively.

In some embodiments, two similar cooking apparatuses are available at the same time for preparing one or more food products. In this case, for example when a whole menu is prepared, the cooking apparatuses may be used in parallel to speed up the cooking process. However, simply preparing different food products of a menu on multiple cooking apparatuses in parallel may lead to poor synchronization of dependent cooking steps. Further, there is potential for improving the efficiency of the food processing method with regards to the overall energy consumption.

BRIEF DESCRIPTION OF THE DRAWINGS

FIG. 5A illustrates an example of the structure of a separate recipe program.

FIG. 5B illustrates an example of the structure of a combined recipe program.

DETAILED DESCRIPTION

Figure 1A:
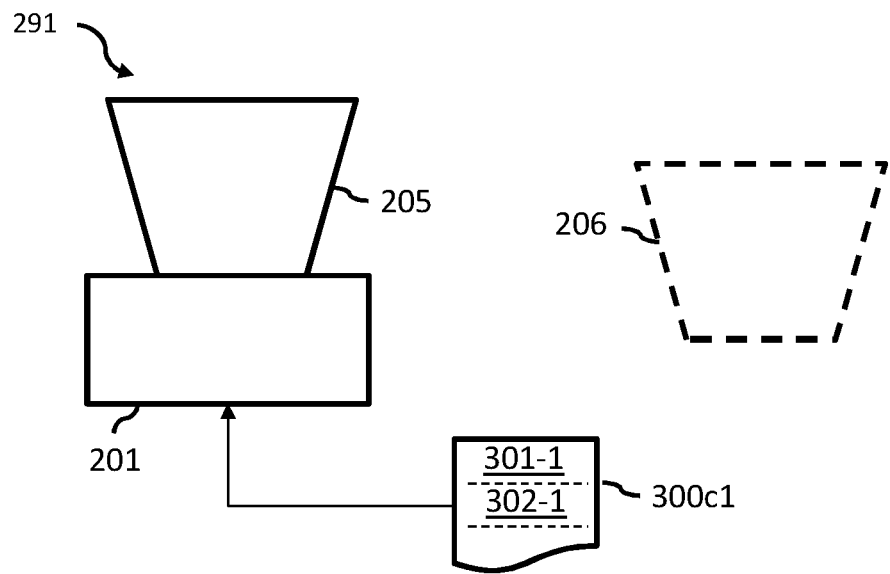
FIG. 1A illustrates a particular multi-function cooking apparatus using a combined recipe program for preparing a complex food product or menu according to one embodiment of the present disclosure.

FIG. 1A illustrates a first embodiment 291 with a particular multi-function cooking apparatus 201 using a combined recipe program 300$c$1 for preparing a complex food product or menu according to one embodiment of the present disclosure. The combined recipe program is generated from one or more separate recipe programs in accordance with predefined partitioning rules to provide a recipe program which executes with improved efficiency regarding the food processing time and energy consumption when compared to the original separate recipe program(s). The cooking apparatus 201 is operated with a heating-and-stirring element (HSE) 205 which is mounted on the cooking apparatus 201 when performing cooking functions in accordance with the combined recipe program 300$c$1. Optionally, a further HSE 206 may be used together with the same cooking apparatus. For example, the first HSE 205 may contain an intermediate food component which is later to be continued. Then the first HSE 205 may be removed and replaced by the further HSE 206. The combined recipe program 300$c$1 has at least two partitions 301-1, 302-1 with recipe program instructions being grouped into subsets related to cold food processing steps and warm food processing steps, respectively. In one embodiment, one partition 301-1 may be assigned to food processing steps performed when using the first HSE 205 and the other partition 302-1 may be assigned to food processing steps performed when using the further HSE 206. In this embodiment, the first HSE 205 may be used for performing the cold food processing steps and the further HSE 206 may be used for performing the warm food processing steps (or vice versa). However, all program instructions of the combined recipe program are processed by the same cooking apparatus 201.

Figure 1B:
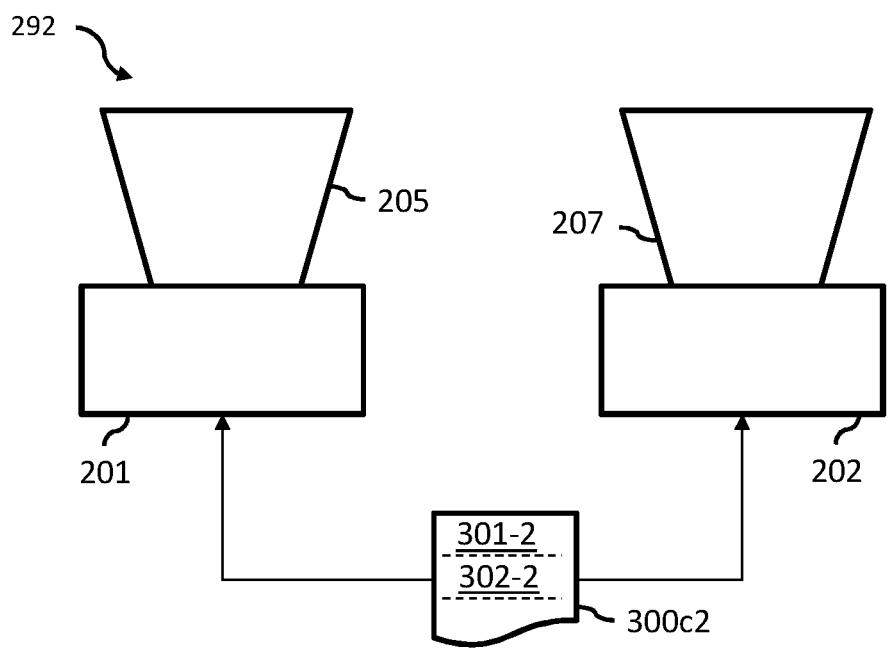
FIG. 1B illustrates a multi-cooking apparatus scenario distributing a combined recipe program to two cooking apparatuses for preparing a complex food product or menu according to one embodiment of the present disclosure.

FIG. 1B illustrates a second embodiment 292 with a distributed cooking scenario where a combined recipe program 300$c$2 is distributed to two cooking apparatuses 201, 202 for jointly preparing a complex food product or menu according to one embodiment of the present disclosure. Each cooking apparatus 201, 202 has at least one heating-and-stirring element 205, 207, respectively. In such a distributed cooking scenario, the combined recipe program 300$c$2 may include additional assignment information with regards to the partitions 301-2, 302-2. The additional assignment information can include a cooking apparatus identifier which indicates to which cooking apparatus the respective partition of the combined recipe program 300c2 is to be distributed for execution. The advantage of the distributed cooking scenario vs. the single cooking apparatus scenario in FIG. 1A is that food processing steps of the combined recipe program which do not have dependencies on other food processing steps of the combined recipe program may be executed in parallel on two or more cooking apparatuses, thus reducing the overall food processing time associated with the execution of all food processing steps. In cases where the partitions 301-2, 302-2 of the combined recipe program are defined according to partitioning criteria taking into account the independence of food processing steps within the combined recipe program, the distributed partitions can be executed in parallel by the corresponding cooking apparatuses and a reduction of the food processing time can be achieved. In cases where dependencies exist between food processing steps which are distributed over partitions executed by different cooking apparatuses, a synchronization mechanism may ensure that the combined recipe program is generated to allow proper execution of the food processing steps. That is, in case a food component is prepared by the multi-function cooking apparatus 201 in accordance with the program instructions of the partition 301-2 and this food component is used as an input for the food processing steps to be executed by the cooking apparatus 202 when executing the partition 302-2, then the synchronization mechanism generates the two partitions 301-2, 302-2 in such a way that the execution of the partition 302-2 will not start before the termination of the execution of partition 301-2.

Details of the generation of the partitions 301-1, 302-1 and 301-2, 302-2 are disclosed in the following detailed description.

Figure 2:
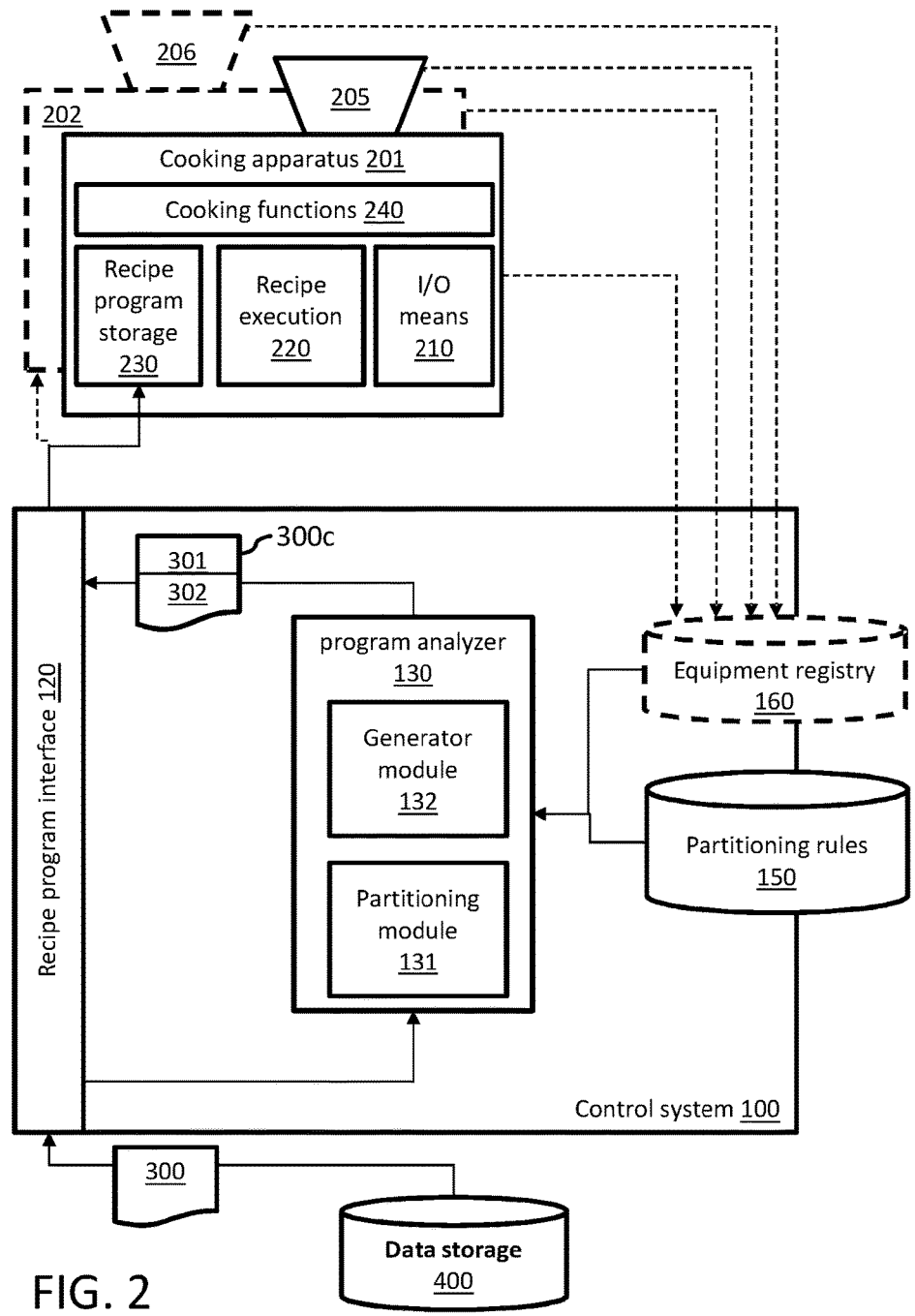
FIG. 2 is a simplified component diagram of a control system for providing a combined recipe program to control one or more multi-function cooking apparatuses according to one embodiment of the present disclosure.
Figure 3:
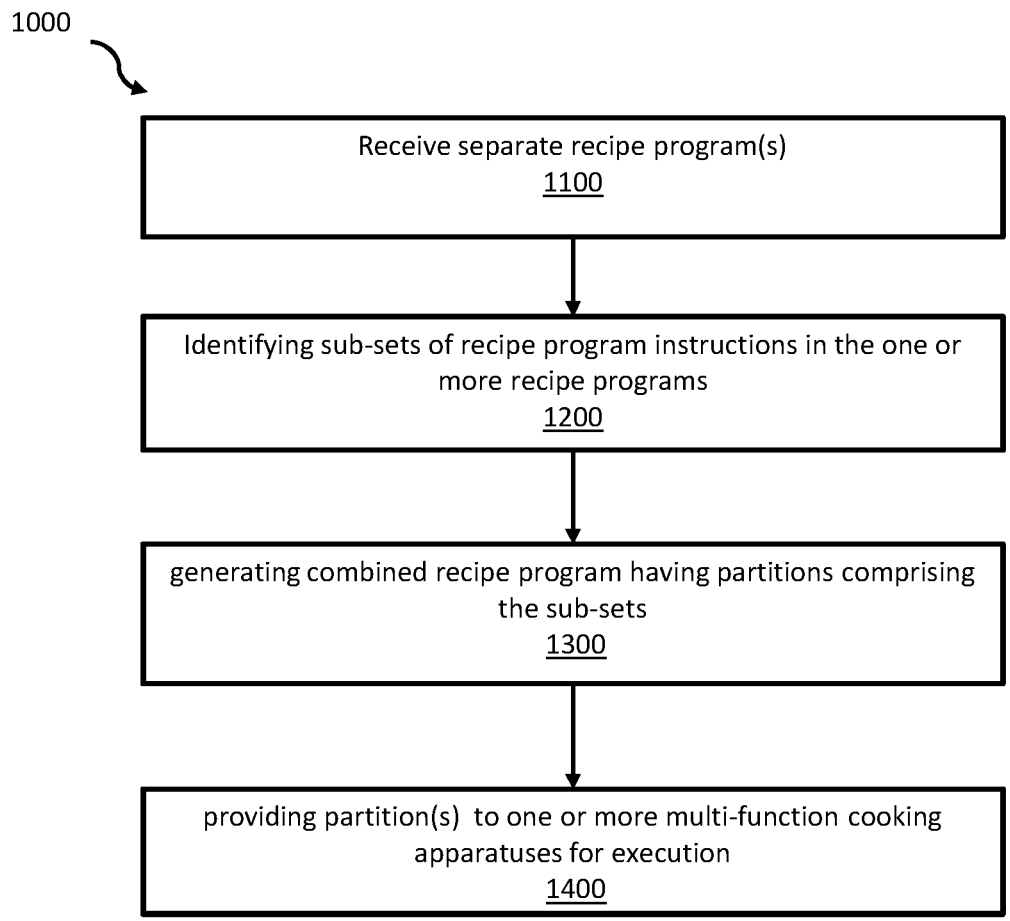
FIG. 3 illustrates an example of partitioning rules as a simplified flow chart to generate a combined recipe program for controlling one or more multi-function cooking apparatuses according to one embodiment of the present disclosure.

FIG. 2 is a simplified component diagram of a control system 100 for providing a combined recipe program to control one or more multi-function cooking apparatuses according to one embodiment of the present disclosure. FIG. 2 will be described in the context of the simplified flowchart of FIG. 3 for the method 1000 being executed by the control system 100. The following description makes use of reference numbers referring to FIG. 2 and FIG. 3.

The control system 100 is communicatively coupled with one or more cooking apparatuses 201, 202 via recipe program interface (RPI) 120. The interface can have any appropriate interface type supporting the exchange of data between the cooking apparatuses 201, 202 and the control system 100. For example, a serial interface (e.g., a USB interface) or a parallel interface (e.g., an IEEE 1284 interface), or an internal communication bus may be used. The control system 100 can be an integrated component of one of the cooking apparatuses (e.g., 201) or it can be implemented remotely (e.g., on a mobile device like a smartphone or tablet PC, or on a remote server which may communicate with the cooking apparatus(es) over the Internet or mobile communication standards or wired communication standards or wireless communication standards). A particular cooking apparatus 201 can include a memory component 230 to store recipe program instructions of a particular recipe program which is provided by the interface 120 of the control system 100. The instructions are to be processed by the corresponding recipe execution component 220. For example, the recipe execution component 220 can include an interpreter for interpreting the recipe instructions. The basic cooking functions are then performed by respective hardware components 240 (e.g., motor, heating means, scales, etc.) of the cooking apparatus under the control of the execution component 220. Basic cooking functions using different hardware may be performed in parallel (e.g., heating and stirring). That is, the execution component 220 transforms the program instructions into control signals applied to the hardware components 240. A person skilled in the art can build a corresponding interpreter for this purpose. Persons of skill in the art can implement the mapping of program instructions to hardware control signals, for example, by using instructions in machine-code, for example, that control the hardware components directly. In case the cooking apparatus receives adjusted recipe program instructions from the control system 100, the adjusted recipe program instructions may replace the corresponding original program instructions stored in the memory component 230. The cooking apparatus 201 further has input/output (I/O) means 210 which are configured to provide information and/or guiding instructions from the cooking apparatus to a user and to receive user commands from the user.

Via the recipe program interface 120, the control system 100 is further communicatively coupled with the data storage device 400 storing separate recipe programs for the cooking apparatus(es). A separate recipe program, as used herein, is a recipe program including recipe instructions which are designed to be executed on one cooking apparatus to perform food processing steps for preparing a food product. Typically, a separate recipe program is directed to the preparation of a single course, such as for example, a starter (appetizer), a main dish or a dessert. The data storage device 400 can be any device with a memory for storing data in electronic format (e.g., a memory stick/card, a memory disk on a remote server, etc.). In some embodiments, the data storage device may be physically connected with the cooking apparatus (e.g., via a USB plug). In other embodiments, the data storage device may be connected via an appropriate network connection (e.g., LAN, WAN or WLAN connection). The data storage device may have a database or a file system to store recipe programs which are intended to be executed by the cooking apparatus. An example of a possible structure for a separate recipe program example is disclosed in the context of FIG. 5A. A recipe program is a digital recipe which includes a plurality of control instructions (referred to as recipe program instructions or program instructions herein) with technical parameter settings to control food processing steps performed by cooking functions 240 of the cooking apparatus 201, 202 when the recipe program is executed by the recipe execution component 220 of the cooking apparatus.

For example, the control system 100 can receive 1100, via the recipe program interface 120, one or more separate recipe programs 300 for preparing one or more food products. The separate recipe program(s) may be stored on the data storage device 400 and are configured to be executed by the recipe execution engine 220 of a particular cooking apparatus 201. The separate recipe program(s) are configured to provide reproducible cooking results for the food products each time when the recipe execution is completed.

When preparing complex food products which may include multiple courses, typically a plurality of separate recipe programs may be retrieved from the data storage where ach separate recipe program corresponds to a separate course or food component of the complex food product. Typically, the separate recipe programs are executed one by one on the cooking apparatus 201. This may cause many heating or cooling cycles and may include a plurality of cleaning steps for the HSE(s) 205, 206 used with the cooking apparatus 201. Performing the food processing steps in a different order while grouping food processing steps across multiple separate recipes can lead to a reduction in energy consumption and to a reduction of the overall food processing time when preparing the entire complex food product.

The control system has a program analyzer module 130 which is configured to generate from the separate recipe program(s) 300 a combined recipe program 300c. The combined recipe program includes program instructions which cover all food processing steps of the original separate recipe programs. This does not mean, that all original recipe program instructions from the separate recipe programs are present in the combined recipe program again. Rather, multiple program instructions, which are related to similar food processing steps, may be consolidated into a single program instructions with adjusted control parameters so that the same food components as before (in the separate recipe programs) are now prepared through the consolidated program instruction. Similar food processing steps are steps with identical or similar control parameter settings applied to similar or identical ingredients. Further, to cover all food processing steps of the original separate recipe programs in the combined recipe program, the module 130 may also include to insert transitioning program instructions to bridge subsets of rearranged program instructions in that the context of the program instructions—if lost through the cross-recipe consolidation of separate program instructions—is reestablished in the combined recipe program. For example, when two instructions from a starter program and a main course program are consolidated by preparing the total amount of the same food component by a single instruction instead of two separate instructions, then a transitioning program instruction may be inserted to reestablish the context of the food component for the starter in the combined program. In other words, a program instruction may be inserted which instructs to reduce the amount of the food component by the amount which is needed later for the main course before the food processing of the starter is continued. To provide such functions, the program analyzer 130 has a partitioning module 131 and a generator module 132. When consolidating or merging two separate recipe program instructions which are related to preparing the same or similar food component based on the same or similar ingredients the generator module may use predefined adjustment rules for adjusting the time control parameter in accordance with such adjustment rules. For example, the amount of ingredients used by the separate recipe programs is simply summed up to result in the total amount of ingredients needed for the consolidated recipe program instruction. In some cases the predefined adjustment rule may result in a time control parameter for the consolidated recipe instruction which is equal to the time control parameter of one of original separate recipe program instructions. In other cases, the time control parameter may be increased in comparison to the original recipe program instructions. For example, the chopping of onions may take the same time for 40 g and for 80 g. However, above a certain threshold amount, the time required to achieve a reproducible chopping result may increase (non-linear or linear increase) with the quantity of the respective ingredient. For example, above 100 g of onions, the chopping time may increase by a second with every additional 50 g added. For any particular ingredient one or more predefined adjustment rules may be stored for each type (chopping, cooking, stirring, etc.) of food processing step. The adjustment rules describe the dependency of the time control parameter on the amount (quantity) of the ingredient. The predefined adjustment rules may be stored in a memory portion of the control system or at a remote storage location accessible by the control system.

The partitioning module 131 can identify 1200 subsets of recipe program instructions in the one or more separate recipe programs 300 in accordance with predefined partitioning rules 150. The predefined partitioning rules 150 may be stored locally in the control system 100 or they may be stored at a remote storage location from where they can be retrieved by the program analyzer 130. The predefined partitioning rules 150 include rules which enable the partitioning module to identify at least a first subset including recipe program instructions for executing food processing steps with compatible ingredient information at temperatures below a predefined temperature threshold. Further the rules enable the partitioning module to identify at least a second subset including recipe program instructions for executing food processing steps with compatible ingredient information at temperatures equal to or above the predefined temperature threshold. In other words, the partitioning rules check the original separate recipe programs (i.e., cross-program check) for instructions which are related to the preparation of identical or similar food components with identical or similar (compatible) ingredients and with identical or similar food processing steps (identical or similar control parameter settings). Once the partitioning module has identified such program instructions it can group the instructions into cold food processing steps (first subset) and warm food processing steps (second subset). When grouping food processing steps performed at low temperatures (below the predefined temperature threshold, e.g., the room temperature or the temperature of the ingredients) and food processing steps performed at high temperatures (equal or above the predefined temperature) unnecessary heating and cooling cycles can be eliminated. There may be multiple pre-defined temperature thresholds for increasing the granularity of the grouping. For example the second subset may include food processing steps performed at a medium temperature (e.g., between room/ingredient temperature and 70° C.), and a third subset may include food processing steps performed at a temperature beyond the second predefined temperature threshold (e.g., >70° C.). A higher granularity of the subsets with regards to the temperature range covered by a subset may lead to further improvements in the reduction of energy consumption.

The generator module 132 generates 1300 the combined recipe program 300c with recipe program instructions covering all food processing steps associated with the one or more separate recipe programs 300 wherein the combined recipe program 300c has at least a first partition 301 comprising the at least first subset, and has at least a second partition 302 comprising the at least second subset. That is, the combined recipe program has at least two partitions wherein one partition is covering the cold food processing steps and another partition is covering the warm food processing steps. In embodiments using multiple temperature thresholds more than two partitions are included where each partition can cover food processing steps performed at a corresponding temperature range. Each partition can include multiple subsets of program instructions corresponding to groups of food processing steps performed at the corresponding temperature range but where the various groups are associated with different food components with incompatible ingredients. In some embodiments, multiple partitions can be generated in relation to the same temperature range. For example, in the distributed cooking scenario (cf. FIG. 1B), multiple cooking apparatuses may be used to perform food processing steps in the same temperature range in parallel to achieve a further reduction of the overall food processing time. In such embodiments, a corresponding partition is generated for each cooking apparatus. That is, in cases where the partitioning module 131 has assigned an identified subset to be executed by a particular cooking apparatus, a corresponding identifier of the particular cooking apparatus is appended to the corresponding combined recipe program steps. The generator module 132 can then use this information to generate a respective partition.

In embodiments supporting distributed cooking or cooking apparatus using more than one HSE, the control system 100 may further use an equipment registry module 160 to register the available equipment. The equipment registry module 160 can be an integrated component of the control system 100 or it may be operated by a remote device (e.g., a server running a registration service). The registration data is then provided to the program analyzer 130. For example, the cooking apparatuses 201, 202 may be able to register with the equipment registry module 160 and also indicate the availability of their HSEs 205, 206. Once the registration data is available to the program analyzer 130, the partitioning module 131 can take it into account when identifying subsets and assigning the subsets to the available cooking equipment. FIG. 5B illustrates and example of a combined recipe program structure with such assignment information.

The partitions 301, 302 of the combined recipe program 300c are then provided 1400 through the recipe program interface 120 to the one or more multi-function cooking apparatuses 201, 202 for execution. In distributed cooking scenarios, the routing of the partitions to the correct cooking apparatuses is enabled by the cooking apparatus identifier assigned to the partitions.

Figure 4:
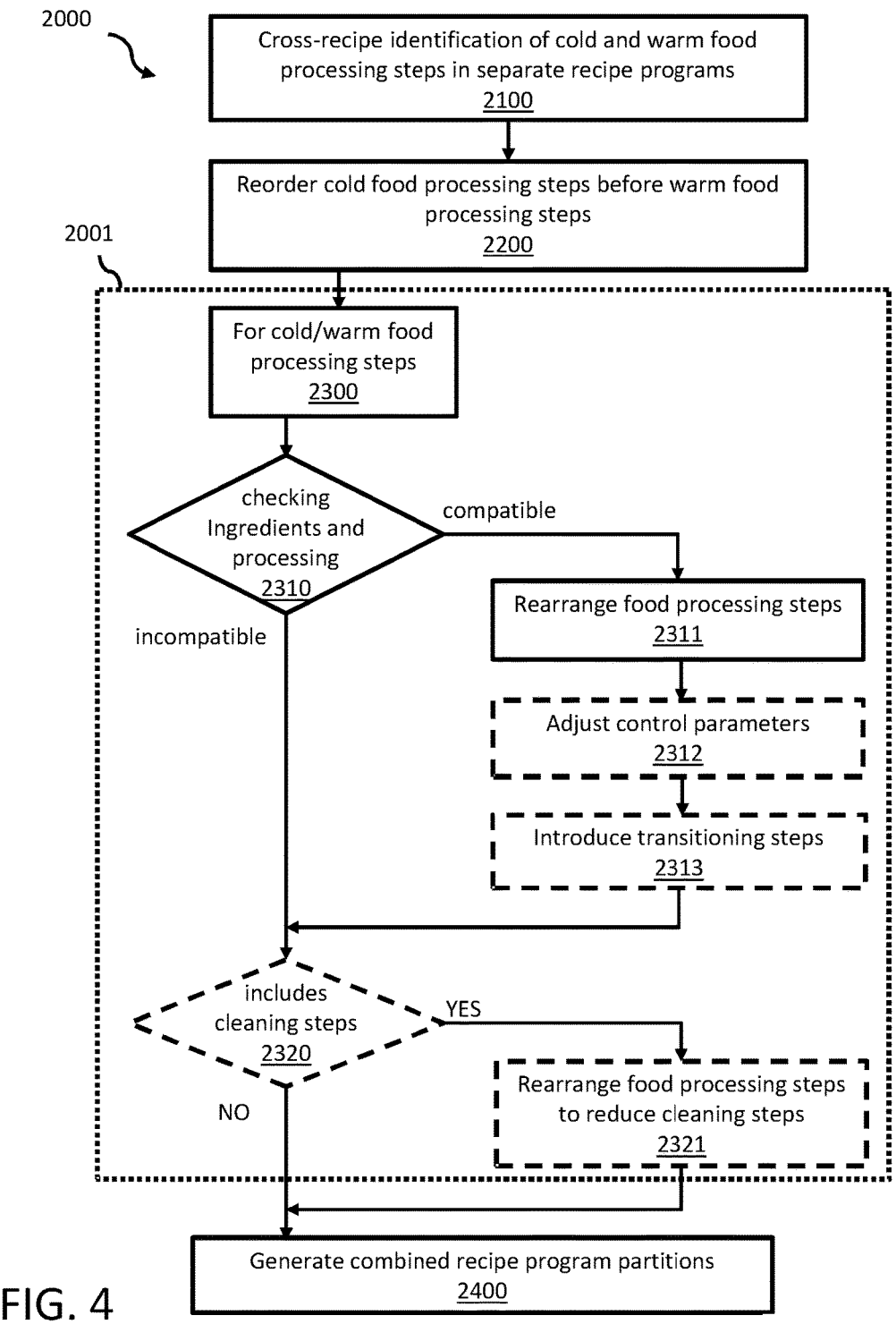
FIG. 4 illustrates and example of a predefined partitioning rule set according to one embodiment of the present disclosure.

FIG. 4 illustrates an example of partitioning rules as a simplified flow chart 2000 to generate a combined recipe program for controlling one or more multi-function cooking apparatuses according to one embodiment of the present disclosure.

In the example, a first rule is implemented as cross-recipe identification 2100 of cold and warm food processing steps in the separate recipe programs. That is, one or more temperature thresholds define at least two temperature ranges to which recipe instructions of the separate recipes are assigned dependent on their temperature control parameter settings. When using at least two temperature thresholds, various gradations of cold and warm are created. Recipe program steps without particular temperature control settings but following on an instruction with such a temperature control setting may be assigned to the same group of food processing steps as the anteceding instruction with a temperature setting unless the cooking context is broken (e.g., the HSE is cleaned in between, the ingredients are exchanged, liquids are added, a long wait time interval occurs between consecutive food processing steps, etc.)

In the example, a second rule controls the reordering 2200 of food processing steps of the menu recipe programs so that cold food processing steps are executed at first and warm food processing steps are executed after the cold food processing steps. In case of more than one temperature threshold, the food processing steps may be reordered according to the assigned temperature intervals in ascending order (e.g., cold middle warm). As a result, all recipe program instructions for the food processing steps of the original separate recipe programs are assigned to a particular group of separate recipe instructions in accordance with temperature values at which the food processing steps are to be performed.

In the example, the block 2001 of rules relates to rules which are applied to each group (e.g., cold, middle, warm, etc.) of separate recipe instructions. In other words, the rules in block 2001 may be first applied to cold food processing steps and then the group of processing steps assigned to the next higher temperature range, and so on. This can be compared to a "for loop" 2300 like structure. That is, for each group the following rules are performed. Thereby, rules illustrated by dashed frames are seen as optional rules.

The first group rule of the example relates to checking 2310 across separate recipe programs if same or similar ingredients are used in different food processing steps and if the processing of the ingredients is similar (i.e., compatible in that similar control parameter value for, e.g., speed, processing time, temperature, etc., are used). If this is the case, the corresponding recipe instructions of the original separate programs are rearranged 2311 into combined steps of the combined recipe program. This may include the adjustment 2312 of control parameters in case where two or more separate program instructions are consolidated into a single combined recipe instruction. For example the amount of ingredients used by the separate program instructions results in an aggregate amount for the combined instruction. Further control parameters may be adjusted. For example, when the amount is increased the food processing time control parameter may be adjusted accordingly for the combined recipe instruction. The adjustment may be based on predefined adjustment rules (e.g., lookup tables or characteristic curves/diagrams providing interpolation of control parameter settings under changing conditions). In some cases, where original separate recipe instructions are rearranged according to the preceding rules it may be necessary to introduce 2313 transitioning steps to re-establish the original context for the rearranged instructions. That is, if the preparation of a given food component occurs in various separate recipe programs, this preparation may be consolidated into a single combined food processing step. However, the later use of the food component which is now produced in a consolidated food processing step of the combined program may include insertion of transitioning instructions regarding the subsequent handling of the combined food component amount (e.g., save ⅓ of the food component in a container for later use).

A second group rule may relate to the analysis 2320 of the respective group for any cleaning steps included in the group. It may be possible that because of the earlier rearrangement 2311 and consolidation of recipe program instructions some of the cleaning steps as defined in the separate recipe programs become dispensable in the combined recipe program. In this case, the unnecessary cleaning steps may simply be removed from the combined recipe program. In addition, if cleaning steps are identified in a particular group, a further rearrangement 2321 of the combined recipe program steps can be performed such that the number of cleaning steps is reduced. For example, combined recipe instructions may still include cleaning steps which originated from a change of ingredients from one separate recipe program to another while in the combined recipe program steps may be rearranged in such a way that they incrementally build on the ingredients of the antecedent steps. This may eliminate the need for some of the original cleaning steps. After this step, the "for"-structure 2001 is repeated for the next group (e.g., cold→warm).

In the following a particular example is described which is based on recipe programs for preparing a menu with three courses with each course including four meal portions. Thereby, the recipe programs are designed to be executed by one cooking apparatus equipped with one heating-and-stirring element. The menu includes a starter (tomato soup), a main course (tuna tomato sauce served with plain rice), and a dessert (berry foam). For preparing this menu, the recipe data storage provides three separate recipe programs wherein each recipe program is associated with one of the courses. In the example, control instructions relate to the heating and stirring functions of the cooking apparatus which are implemented/executed by the heating and stirring element. The control instructions can specify a control parameter for the temperature of the heating function, a control parameter for the rotational speed of the stirring function, and a time interval during which said control parameters are to be applied for the respective cooking step corresponding to program instructions. Further control parameters may be used for additional cooking functions of the cooking apparatus. The notation for the set of control parameters used in this example where the heating and stirring function are used simultaneously is time/temperature/speed where time stands for said time interval, temperature stands for the temperature control value, and speed stands for the speed control value. The notation for the set of control parameters used in this example where only the stirring function is used is time/speed.

The starter recipe program includes instructions which include information about the ingredients needed for the respective course and control instructions for controlling the respective cooking functions of the cooking apparatus. For example, the original recipe program for the first course (starter) tomato soup includes the following list of ingredients (tsp=tea spoon):
1 garlic clove
80 g onions
1 carrot, cut in pieces
30 g butter
500 g tomatoes, cut into quarters
1 tsp salt
1 tsp dried oregano
300 g water
1 stock cube
100 g cream
2-4 fresh basil leaves The food preparation steps of the starter recipe program may include the following control instructions:
1.1 Place garlic clove, onions and carrot into mixing bowl and chop 3 sec/speed 5. Scrape down sides of mixing bowl with spatula.
1.2 Add butter and sauté 3 min/120 C/speed 1.
1.3 Add tomatoes, salt and dried oregano and chop 5 sec/speed 5.
1.4 Add water, stock cube and cook 15 min/100 C/speed 2.
1.5 Add cream, basil leaves and blend 1 min/speed 7 with measuring cup on lid.
1.6 Serve warm
1.7 Bowl is rinsed out with tap lukewarm water and ready to be used. (not washed)

For example, the original recipe program for the second course (main course) tuna tomato sauce served with plain rice includes the following list of ingredients:
1 garlic clove
80 g onions
1 carrot, cut in pieces
30 g butter
500 g tomatoes, cut into quarters
1 tsp salt
1 tsp dried oregano
800 g water
1 stock cube
300 g plain white rice
100 g yoghurt
2 fresh basil leaves
360 g of tuna in oil (3 small tins)

The food preparation steps of the main course recipe program may include the following control instructions:
2.1 Place garlic clove, onions and carrot into mixing bowl and chop 3 sec/speed 5. Scrape down sides of mixing bowl with spatula.
2.2 Add butter and sauté 3 min/120 C/speed 1.
2.3 Add tomatoes, salt, and dried oregano and chop 5 sec/speed 5.
2.4 Add in the bowl 200 g of water, stock cube.
2.5 In steam cooker place a rectangular aluminum container with the dry rice and 600 g of water, salt to taste and cover it with an aluminum foil, close the steam cooker and place it on the TM bowl and cook 30 min/100 C/speed 1. Set steam cooker aside.
2.6 Add yogurt, basil leaves and blend 1 min/speed 7 with measuring cup on lid.
2.7 Add the tuna and mix only with aid of spatula.
2.8 Serve the tuna sauce warm over the cooked rice.
2.9 Clean bowl For example, the original recipe program for the third course (dessert) berry foam includes the following list of ingredients:
140 g sugar
500 g mixed frozen red berries
20 g lemon juice
1 egg white The food processing steps of the dessert recipe program may include the following control instructions:
3.0 Comment: A clean (and cold) bowl is needed for dessert recipe
3.1 Place sugar into mixing bowl and pulverize 15 sec/speed 10.
3.2 Add mixed frozen red berries, lemon juice and egg white into mixing bowl. Blend with aid of spatula 40 sec/speed 5.
3.3 Insert butterfly whisk and mix 3 min/speed 3.5.
3.4 Reserve in the refrigerator until ready to serve.

TABLE 1

| Steps | Separate Preparation | | | |
|---|---|---|---|---|
| | Sek. | Min. | Temp. | Speed |
| 1.1 | 3 | | | 5 |
| 1.2 | | 3 | 120 | 1 |
| 1.3 | 5 | | | 5 |
| 1.4 | | 15 | 100 | 2 |
| 1.5 | | 1 | | 7 |
| 1.6 | | | | |
| 1.7 | | | | |
| 2.1 | 3 | | | 5 |
| 2.2 | | 3 | 120 | 1 |
| 2.3 | 5 | | | 5 |
| 2.4 | | | | |
| 2.5 | | 30 | 100 | 1 |
| 2.6 | | 1 | | 7 |
| 2.7 | | | | |
| 2.8 | | | | |
| 2.9 | | | | |
| 3.1 | 15 | | | 10 |
| 3.2 | 40 | | | 5 |
| 3.3 | | 3 | | 3.5 |
| 3.4 | | | | |
| total | 71 | 56 | | |
| total sum (min) | | 57.18 | | |

Table 1 summarizes the control parameters of all program instructions of the three original recipe programs for the three courses when being consecutively performed. The total execution time adds up to 57.18 min for the above example.

FIG. 5A illustrates an example of the structure of the separate starter recipe program 501 including the program steps 1.1 to 1.3 by way of example. For each step (program instruction) the ingredients included in the respective step are listed in the field "ingredient". The field "text" includes the instructions which are displayed by the executing cooking apparatus to the user (e.g., by a local display of the cooking apparatus or through a remote display on a smartphone or tablet computer). The field "code instruction" includes the control parameter setting for the respective program step in a machine readable format so that the execution engine of the cooking apparatus can execute the instructions to perform the corresponding cooking function.

Recipe Partitioning Rules

The order in the original menu recipe is used as default order for the food processing steps. The default order is then rearranged by the program analyzer. A cross-recipe re-partitioning of the three recipe programs is thereby performed in accordance with the rules defined by the partitioning constraints. Examples for such rules which are applicable to the three course menu example are given in the following. A person skilled in the art may define further partitioning rules/constraints for other food products/menus.

A. Cross-recipe identification of cold and warm food processing steps in the separate recipe programs. Thereby, warm food processing steps may be defined as all steps where the heating function of the cooking apparatus is used. In an alternative embodiment, warm food processing steps may defined as all steps where the heating control parameter is at least above a predefined threshold value (e.g., 25° C.). All remaining food processing steps may be considered to be cold food processing steps. For the example with the original separate preparation of the three courses (cf., Table 1), the food processing steps 1.2, 1.4, 2.2, and 2.5 are identified as warm food processing steps.

B. Reordering of food processing steps of the menu recipe programs so that cold food processing steps are executed at first and warm food processing steps are executed after the cold food processing steps. Optionally, the cold food processing steps may be assigned to the first heating-and-stirring element and the warm food processing steps may be assigned to the second heating-and-stirring element. Warm food processing steps may be further partitioned into sub-groups with equal temperature control parameters. For example, steps 1.2/2.2 may form a first sub-group 120° C., and steps 1.4/2.5 may form a second sub-group 100° C.

C. For the cold food processing steps:
  a. Check if same or similar ingredients are used in different preparation steps and if the processing of the ingredients is similar (i.e., similar control parameter values for e.g., speed, processing time, temperature, etc.)
  b. If so, combining related steps
     i. in case a larger amount of ingredients is used the processing time may be adapted based on threshold values
     ii. rearrange related food processing steps
     iii. introduce transitioning steps in the recipe based on the original amount distribution of ingredients
  c. Analyze cold menu preparation steps for any cleaning steps
     i. rearrange preparation steps of the recipe, under consideration of required cleaning steps so that the number of cleaning steps is minimized D. For the warm food processing steps
  a. Check if same ingredients are used in different preparation steps and if the processing of ingredients is similar (e.g. control parameter value for temperature, processing time, processing speed)
  b. If so, combining related steps
     i. In case a larger amount of ingredients is used the processing time may be adapted based on threshold values
     ii. rearrange related preparation steps
     iii. introduce transitioning steps in the recipe based on the original amount distribution of ingredients
  c. Analyzing warm menu preparation steps for any cleaning steps
     i. rearrange preparation steps of the recipe, under consideration of required cleaning steps so that number of cleaning steps is minimized The entire rule set may be processed at the beginning of the food processing or it may be processed first for the cold processing steps and afterwards for the warm processing steps. The partitioning of the recipe can be performed on the cooking apparatus or on a remote (e.g. server/cloud) system or in a combined fashion. In case the partitioning is done on a remote system the modified recipe can be transferred completely upon completion of the partitioning or it may be transferred step by step or block wise before the execution of the respective rearranged recipe program instructions.

The application of the partitioning rules/constraints to the original three separate recipe programs may result in the following re-partitioned combined recipe program which includes all steps necessary to prepare the entire three course menu. For example, for a first partition PI of the combined recipe program, the program analyzer may select all food processing steps of the dessert course as they all use the same ingredients and no heating instruction is included in the food processing steps 3.0 to 3.4. The application of the partitioning rules C. may result in the following partition PI:

Ingredients:
140 g sugar
500 g mixed frozen red berries
20 g lemon juice
1 egg white Food processing steps:
I.0 Comment: A clean (and cold) bowl is needed for dessert recipe
I.1 Place sugar into mixing bowl and pulverize 15 sec/speed 10
I.2 Add mixed frozen red berries, lemon juice and egg white into mixing bowl. Blend with aid of spatula 40 sec/speed 5.
I.3 Insert butterfly whisk and mix 3 min/speed 3.5.
I.4 Reserve in the refrigerator until ready to serve.
I.5 Mixing Bowl is rinsed out with tap lukewarm water and ready to be used. (not washed)

In the example, the program analyzer has added a new rinsing step 1.5 according to the above recipe partitioning rule C.c.i which allows reusing the mixing bowl (heating and stirring element) after the completion of partition I of the combined recipe program for other food processing steps. Alternatively, the prepared berry foam dessert could be kept in the mixing bowl and the entire mixing bowl could be placed in the refrigerator. In this case, no further rinsing step would be inserted and the following food processing steps would make use of a further bowl or a further cooking apparatus with its own mixing bowl.

For example, for a second partition PII of the combined recipe program, the program analyzer may select food processing steps from the starter recipe program as well as steps from the main course recipe program. The program analyzer applies recipe partitioning rules D. to the original separate recipe programs. The application of the partitioning rules D. may result in the following second partition PII for preparing the tomato soup and the tuna tomato sauce. The following first set of ingredients is identified as being common to both original separate recipe programs.

Ingredients:
2 garlic cloves
160 g onions
2 carrots, cut in pieces
60 g butter
1000 g Tomatoes cut in small pieces
2 tsp salt
2 tsp dried oregano Further, the steps 1.1 to 1.3 for processing such ingredients in the starter recipe program correspond to the steps 2.1 to 2.3 in the main course recipe program. Therefore, according to the recipe partitioning rules D.a. to D.b.ii. the program analyzer consolidates those steps into the following portion of the second partition PII:

Food processing steps:
II.1 Place garlic cloves, onions and carrots into mixing bowl and chop 3 sec/speed 5. Scrape down sides of mixing bowl with spatula (use rinsed mixing bowl if available).
II.2 Add butter and sauté 3 min/120 C/speed 1.
II.3 Add tomatoes, salt, dried oreganos and chop 7 sec/speed 5.

The combined recipe program instruction II.3 is a consolidated/merged instruction of the original separate recipe program instructions 1.3 and 2.3. In the original separate program instruction the time control parameter for the chopping step is 5 sec. In the consolidated instruction the chopping time for chopping the double quantity is increased to 7 sec based on a corresponding predefined adjustment rule.

According to recipe partitioning rule D.b.iii. additional separation steps are inserted because the program analyzer recognizes that the food preparation steps are forking apart for the starter and main course food components. Therefore, at this point only a portion of the so far prepared food components can be used for proceeding with either the starter or the main course preparation. For example, the program analyzer can make a decision regarding the next food processing steps for the second partition PII based on temperature control parameters. It may decide for steps which have temperature control parameters closest to the current temperature of the mixing bowl to avoid energy consuming heating and cooling cycles. However, in this example, both options (starter and main course recipe program instructions) include temperature control parameters of 100° C. Therefore, the program analyzer may select by random whether to continue with the starter or with main course related food processing steps. Other partitioning criteria may also be used. For example, in case that there is no energy saving effect, the program analyzer may decide in accordance with the original order of courses. Using this criterion for the example, the program analyzer selects food processing steps for the tomato soup starter for continuation of the second partition PII. In this case, the program analyzer can compute the difference between the ingredients included for the starter course (known from the original starter recipe program) and the currently prepared quantity and insert a combined recipe program instruction to reduce the current content of the mixing bowl accordingly (in the current example by 50%). Further, because the program analyzer knows that the current state of ingredients corresponds to the state indicated in which to continue with the original step 1.4, a further compound recipe instruction may be inserted to indicate to the user that no bowl cleaning is required for continuing with the next food processing step:

Food processing steps:
II.4 Remove mixing bowl and pour out half of its content and set aside
II.5 Without bowl cleaning, place back the mixing bowl on to the cooking apparatus with the rest of the tomato preparation and continue with the soup recipe.

Remaining ingredients to complete the tomato soup recipe are retrieved from the original starter recipe program:
300 g water
1 stock cube
100 g cream
2-4 fresh basil leaves The program analyzer may now add the food processing steps 1.4 to 1.6 of the original starter recipe program to the second partition PII.

Food processing steps:
II.6 Add water, stock cube and cook 15 min/100 C/speed 2 to the bowl.
II.7 Add cream, basil leaves and blend 1 min/speed 7 with measuring cup on bowl lid.
II.8 Set the soup aside.

It is to be noted that the heating step II.6 benefits from the fact that the bowl is still hot at the time when the water is added because of previous step II.2. In a multiple bowl environment step II.2 could be implemented in that the soup stays within the bowl and a further bowl would be used to finish the main course recipe. However, this may include and additional cleaning or rinsing step and a heating step for a cold bowl. The program analyzer knows from the original main course recipe program that the remaining steps are not incompatible with the current status of the bowl. Therefore, the program analyzer can insert a further combined recipe program instruction II.9 in the second partition PII to indicate to the user that the same bowl may be further used for the remaining food processing steps. It is to be noted that again the mixing bowl is still hot at this point in time, which is a positive effect for the overall energy balance (energy performance) of the combined recipe program when executing the last heating step of the combined recipe program in case the remaining food processing steps for the main course are executed with the same bowl. That is, the energy consumption is further reduced in this case.

Food processing steps:
II.9. Bowl is not rinsed out/place reserved ingredients from step II.4 back into the mixing bowl.

Alternatively, in case of using a further mixing bowl or a further cooking apparatus with a separate mixing bowl for the remaining food processing steps, the completed starter food product may be kept in the mixing bowl and the program analyzer may create a third partition PIII of the combined recipe program. The third partition can then be distributed to the further cooking apparatus. For the remaining food processing steps, both alternatives are indicated.

The ingredients needed for the final food processing steps can be determined by the program analyzer from by deriving the delta of the ingredients already used in the second partition PII and the complete list of ingredients for the main course from the original main course recipe program.

Remaining ingredients to complete the main course as retrieved from the original starter recipe program:
800 g water
1 stock cube
300 g plain white rice
100 g yoghurt
2 fresh basil leaves
360 g of tuna in oil (3 small tins)

In the example, where a third partition PIII is created because the main course preparation is finished using a further mixing bowl (e.g., on a further cooking apparatus), the step III.0 is inserted (instead of II.9)

Food processing steps in the combined recipe program for finishing the main course recipe:

III.0 place reserved ingredients from step II.4 into the mixing bowl

The program analyzer then continues with adding the remaining steps of the original main course recipe program to either the second partition PII or to the third partition PIII dependent on the chosen embodiment.

Food processing steps:

II.10/III.1 Add to the reserved tomato preparation in the mixing bowl 200 g of water and stock cube.

II.11/III.2 In the steam cooker place a rectangular aluminum container with the dry rice and 600 g of water, salt to taste and cover it with an aluminum foil, close the steam cooker with the lid and place it on the mixing bowl; cook the tomato sauce and rice by programming 30 min/100 C/speed 1. Set steam cooker aside.

II.12/III.3 Add to mixing bowl yoghurt, basil leaves, place measuring cup on lid and blend 1 min/speed 7.

II.13/III.4 Add the tuna and mix only with aid of spatula.

II.14/III.5 Serve the tuna sauce over the cooked rice.

All three courses of the menu are now completed by executing the instructions of the combined recipe program and the meal can be served. Table 2 summarizes the re-partitioned food processing steps with a mapping to the corresponding food processing steps of the original separate recipe programs (column "Sep. steps") and the control parameters of the respective recipe program instructions.

FIG. 5B illustrates an example of the structure of the combined recipe program 502 including the combined program steps II.1 to II.3 by way of example. In the combined program steps the original separate program steps 1.1/2.1, 1.2/2.2, and 1.3/2.3 are consolidated. In addition to the program structure of the separate recipe programs (cf. FIG. 5A) the combined recipe program structure 502 may further include a field "P" for indicating the partition to which the respective program steps were assigned. Further, in embodiments with multi-HSE use and/or distributed cooking with multiple cooking apparatuses, a field "HSE/CA" may include the identifiers of the heating-and-stirring element and/or cooking apparatus to which the partition is to be applied or to be distributed (deployed).

TABLE 2

| | Combined Recipe Program | | | | |
|---|---|---|---|---|---|
| Steps | Sep. steps | Sek. | Min. | Temp. | Speed |
| I.1 | 3.1 | 15 | | | 10 |
| I.2 | 3.2 | 40 | | | 5 |
| I.3 | 3.3 | | 3 | | 3.5 |
| I.4 | 3.4 | | | | |
| I.5 | | | | | |

TABLE 2-continued

| | Combined Recipe Program | | | | |
|---|---|---|---|---|---|
| Steps | Sep. steps | Sek. | Min. | Temp. | Speed |
| II.1 | 1.1 & 2.1 | 3 | | | 5 |
| II.2 | 1.2 & 2.2 | | 3 | 120 | 1 |
| II.3 | 1.3 & 2.3 | 7 | | | 5 |
| II.4 | | | | | |
| II.5 | | | | | |
| II.6 | 1.4 | | 15 | 100 | 2 |
| II.7 | 1.5 | | 1 | | 7 |
| II.8 | | | | | |
| II.9/III.0 | | | | | |
| II.10/III.1 | | | | | |
| II.11/III.2 | 2.5 | | 30 | 100 | 1 |
| II.12/III.3 | 2.6 | | 1 | | 7 |
| II.13/III.4 | | | | | |
| II.14/III.5 | | | | | |
| total | | 65 | 53 | | |
| total sum (min) | | | 54.08 | | |

As illustrated in the row total sum (min) of table 2, the execution time for the combined recipe program vs. the total execution time of the sequentially executed separate recipe programs is reduced from 57.18 min to 54.08 min by 5.4%. Thereby, the time for cleaning the mixing bowl required in the separate execution scenario is even not considered. That is, the re-partitioning of the separate recipe programs into the combined recipe program allows to reduce the overall food processing time by identifying, aggregating and re-arranging such food processing steps of the original recipe programs which comply with the respective repartitioning rules used by the program analyzer.

The cross-recipe repartitioning of the recipe programs also improves the overall energy balance (or energy performance) of the food processing method when executed according to the repartitioned combined recipe program. For the above three course menu example, the combined recipe program reduces the energy consumption by approximately 3% compared to the sequential execution of the separate recipe programs. This effect is based on the initial separation of cold and warm food processing steps.

The following calculation illustrates how the reduced energy consumption can be estimated in the scenario with partitions I and II. As basis the following information is used:

Heating duration of 1l water to 100° is 477 sec. and the energy consumption is approximately 112 Wh Theoretic energy consumption for the heating is 93.4 Wh (based on water heat capacity of 4.19 kJ/kg K and a temperature difference of 80° C.)

Cooking of 1l with 100° C. (after reaching 100° C.) for 30 minutes consumes 371 Wh Heat capacity for different ingredients
Water 4.19 kJ/kg K
Onions 3.77 kJ/kg K
Tomatoes 3.89 kJ/kg K
Carrots 3.64 kJ/kg K
Butter 2.51-2.62 kJ/kg K
Garlic 2.89 kJ/kg K The main energy consumption is caused by the heating/cooking time during the tomato soup preparation and the main course. The other food processing steps including the cleaning steps are not considered in the energy balance as the consumption of these steps is quite low compared to the heating consumption.

For the tomato soup approximately. 800 ml have to be heated up to 100° C. and cooked for 15 minutes (steps 1.4/II.6):
  Heating up period 89 Wh (duration 380 sec.)
  Cooking period 85 Wh (duration 520 sec.)
  In total 174 Wh (duration 900 sec.)
For the main course approximately 700 ml have to be heated up to 100° C. and cooked for 30 minutes (steps 2.5/II.11):
  Heating up period 78 Wh (duration 333 sec.)
  Cooking period 212 Wh (duration 1467 sec.)
  In total 290 Wh (duration 1800 sec.)
Each dedicated heating/sauté step (1.2 & 2.2) consumes approximately 23 Wh.
The combined heating/sauté step (2nd Step.2) consumes approximately 31 Wh.
For all other steps a total energy consumption of 12 Wh is assumed.

Based on the above consideration following approximate energy consumption is determined:
Separate preparation (174+290+23+23+12) Wh=522 Wh
Combined preparation (174+290+31+12) Wh=507 Wh
Energy saving 522 Wh−507 Wh=15 Wh=>2.87%

As a result, the cross-recipe re-partitioning of separate recipe programs with cold and warm food processing steps leads to a reduction of energy consumption when executing the repartitioned combined recipe program if the food processing steps can be rearranged according to the repartitioning rules/constraints used by the program analyzer.

In another embodiment, a further method, system and computer program product is provided for partitioning machine readable recipe programs for one or more multi-function cooking apparatuses with at least two similar heating-and-stirring elements for joint processing of one or more food products wherein the at least two similar heating-and-stirring elements have at least pairwise common subsets of cooking functions.

The method includes: providing, by a storage component, one or more separate recipe programs for preparing one or more food products wherein the one or more recipe programs include machine readable recipe program instructions configured to control functions of a particular multi-function cooking apparatus for sequentially executing food processing steps to prepare the one or more food products; identifying, by a program analyzer component, recipe program instructions which can be executed by cooking functions supported by the at least two similar heating-and-stirring elements; partitioning, by the program analyzer component, the one or more recipe programs into recipe sub-programs in accordance with predefined optimization constraints for optimizing the joint processing wherein each sub-program includes recipe program instructions associated with one of the at least two similar heating-and-stirring elements, and wherein at least one particular sub-program includes recipe program instructions which are executable by a cooking function supported by a particular heating-and-stirring element operated by a particular multi-function cooking apparatus; and providing the at least one particular sub-program to the particular multi-function cooking apparatus operating the particular heating-and-stirring element to enable the particular heating-and-stirring element to participate in the optimized joint processing of the one or more food products when executing the particular sub-program by the particular multi-function cooking apparatus.

In this embodiment, at least two heating-and-stirring elements are used—either by a single multi-function cooking apparatus (like for example, the embodiment of FIG. 1A with two HSEs) or by a plurality multi-function cooking apparatuses (like for example, the embodiment of FIG. 1B). Similar to the previously disclosed embodiments, the control system implementing the components for executing the above method may be a separate system communicatively coupled to the one or more cooking apparatuses or it may be an integrated component of one of the multi-function cooking apparatuses. The control system may be implemented in the same way as the system embodiment disclosed in FIG. 2. However, in this embodiment, a partitioning and grouping of the original separate program instructions occurs with regards to the two available HSEs in that at least one sub-program (partition) is tailored to be executed using the first HSE and at least a second sub-program (partition) is tailored to be executed using the second HSE. With two HSEs it is always possible to group or merge recipe program instructions into partitions of a combined program where each of the HSEs is used for food processing steps performed in a respective temperature range. In other words, cool and warm food processing steps can be executed by the first and second HSE, respectively. This again saves energy by avoiding unnecessary heating or cooling steps compared to an embodiment with a single HSE.

The predefined optimization constraints may include rules to optimize the joint processing with regards to synchronization of operating the at least two similar heating-and-stirring elements. In other words, food processing time can be shortened by adjusting timing information in the combined recipe instructions of the various sub-programs so that unnecessary idle time of one of the HSEs can be avoided.

Further, the predefined optimization constraints may include rules to optimize the joint processing with regards to the aggregate energy consumption when operating the at least two similar heating-and-stirring elements. The energy saving is disclosed in details with regards to the previously disclosed example with the three course menu.

The particular sub-program may include recipe program instructions related to processing food components with the same or similar ingredients. That is, advantageously food processing steps associated with compatible ingredient information are grouped or merged into the same sub-program (partition).

Further, the particular sub-program may include recipe program instructions related to processing food components within a predefined temperature range. That is, advantageously food processing steps with similar temperature control parameter values are grouped or merged into the same sub-program (partition).

The at least two similar heating-and-stirring elements can be operated by the particular multi-function cooking apparatus and the respective sub-programs may be executed sequentially by the particular multi-function cooking apparatus. In other words, the same multi-function cooking apparatus uses two or more HSEs alternating.

In one embodiment, a first one of the least two similar heating-and-stirring elements may be operated by the particular multi-function cooking apparatus and a second one of the least two similar heating-and-stirring elements may be operated by a further multi-function cooking apparatus. In other words, the at least two HSEs are used and operated by at least two multi-function cooking apparatuses. In this embodiment, the method may further include distributing the corresponding sub-programs to the particular and the further cooking apparatus in accordance with the heatingand-stirring elements operated by the cooking apparatuses, respectively. Thereby, the particular sub-program may include recipe program instructions configured to complete processing of a particular food component before the execution of the further sub-program starts on the further cooking apparatus wherein the further cooking apparatus may request the particular food component as an input. Thereby, the synchronization between the at least two multi-function cooking apparatuses is improved in joint or parallel cooking scenarios where multiple cooking apparatuses are used in parallel for joint processing of one or more food components or food products.

Figure 6:
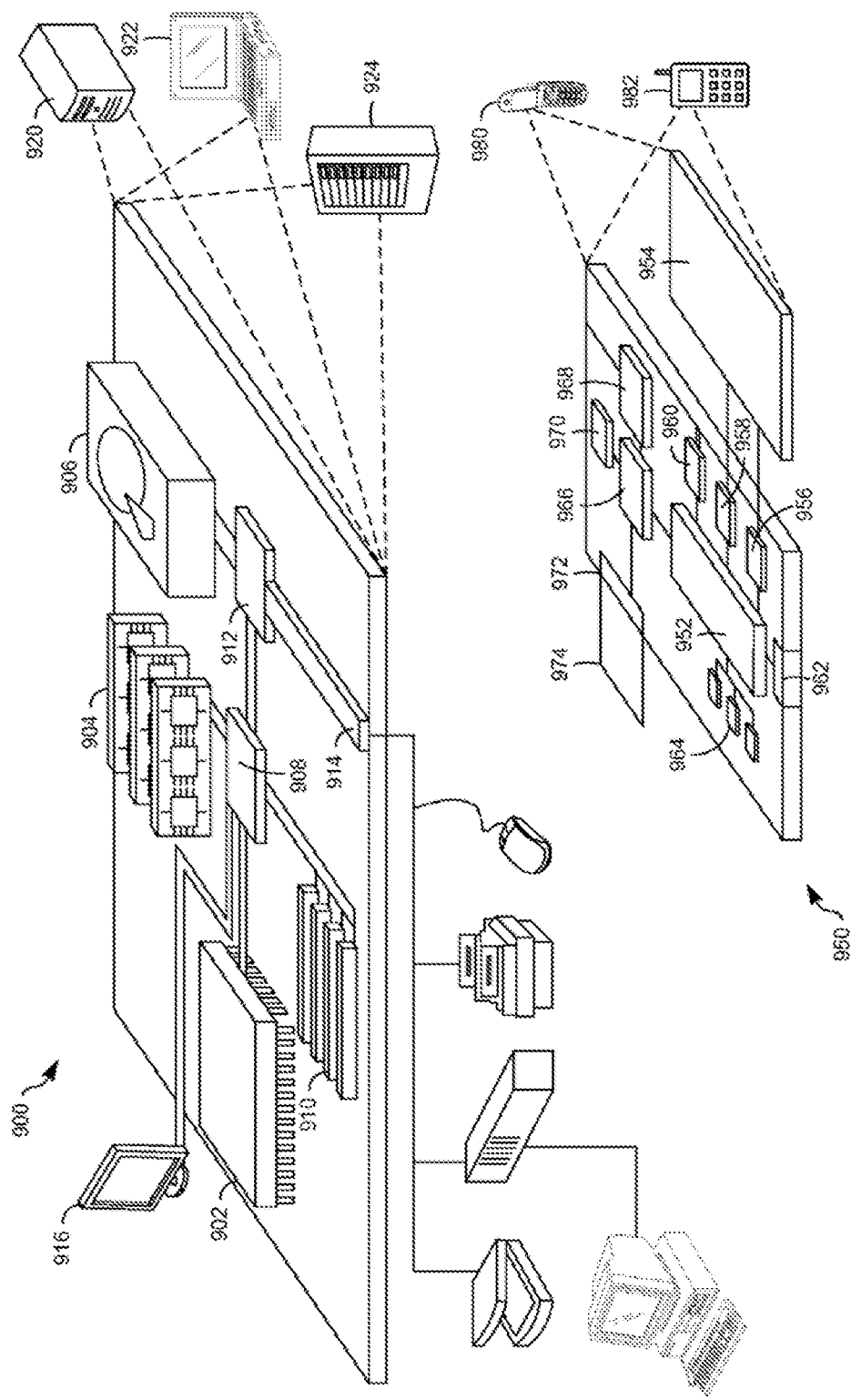
FIG. 6 is a diagram that shows an example of a generic computer device and a generic mobile computer device, which may be used in embodiments of the present disclosure.

FIG. 6 is a diagram that shows an example of a generic computer device 900 and a generic mobile computer device 950, which may be used with the techniques described here. Computing device 900 relates in an exemplary embodiment to the control system 100 (cf. FIG. 1). Computing device 950 is intended to represent various forms of mobile devices, such as personal digital assistants, cellular telephones, smart phones, and other similar computing devices. In an exemplary embodiment of this disclosure the computing device 950 may serve as a frontend control device of the control system 900. The components shown here, their connections and relationships, and their functions, are meant to be exemplary only, and are not meant to limit implementations of the subject matter described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, ZigBee, WLAN, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952 that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, ZigBee or other such transceiver (not shown). In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the present disclosure.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A control system for partitioning machine readable recipe programs wherein the machine readable programs, when executed by one or more multi-function cooking apparatuses cause the one or more multi-function cooking apparatuses to process one or more food products, the system comprising:

a recipe program interface configured to receive, from a storage component, one or more separate recipe programs for preparing one or more food products, wherein the one or more separate recipe programs include machine readable recipe program instructions configured to control functions of a particular multi-function cooking apparatus for executing food processing steps to prepare the one or more food products in accordance with the one or more separate recipe programs;

a partitioning module configured to identify, in accordance with predefined partitioning rules, subsets of recipe program instructions in the one or more recipe programs wherein at least a first subset includes recipe program instructions for executing food processing steps with first compatible ingredient information, and at least a second subset includes recipe program instructions for executing food processing steps with second compatible ingredient information, wherein food processing steps are configured to be executed together or as a sequence based on a determined compatibility of ingredients;

a generator module configured to generate a combined recipe program with recipe program instructions covering all food processing steps associated with the one or more separate recipe programs wherein the combined recipe program has at least a first partition comprising the at least first subset, and has at least a second partition comprising the at least second subset; and the recipe program interface further configured to provide the first and second partitions to the one or more multi-function cooking apparatuses for execution.

2. The system of claim 1, further comprising:

grouping recipe program instructions from at least two of the recipe programs according to temperature range, wherein the recipe program instructions of the at least first subset relate to food processing steps performed at one or more temperatures in a first temperature range, and wherein the recipe program instructions of the at least second subset relate to food processing steps performed at one or more temperatures in a different second temperature range.

3. The system of claim 1, wherein the generator module is further configured to merge a plurality of recipe program instructions of the one or more separate recipe programs related to compatible ingredients into a single recipe program instruction of the combined recipe program.

4. The system of claim 3, wherein the merged single recipe program instruction of the combined recipe program includes a food processing time control parameter adjusted in accordance with a predefined adjustment rule.

5. The system of claim 1, wherein the generator module is further configured to:

add, in accordance with the predefined partitioning rules, one or more transitioning recipe instructions to the first or second partition, wherein a particular transitioning recipe instruction is determined based on a comparison of the one or more separate recipe programs with the partitions of the generated combined recipe program; and remove, in accordance with the predefined partitioning rules, one or more original separate recipe instructions from the first or second partition, wherein a particular original separate recipe instruction is determined based on a comparison of the one or more separate recipe programs with the partitions of the generated combined recipe program.

6. The system of claim 1, wherein the first and second partitions are provided to the particular multi-function cooking apparatus and the first partition is to be executed with at least a first heating-and-stirring element of the particular multi-function cooking apparatus, and the second partition is to be executed with at least a second heating-and-stirring element of the particular multi-function cooking apparatus.

7. A computer-implemented method for partitioning machine readable recipe programs wherein the machine readable programs, when executed by one or more multi-function cooking apparatuses, cause the one or more multi-function cooking apparatuses to process one or more food products, the method comprising:

receiving, from a storage component, one or more separate recipe programs for preparing one or more food products, wherein the one or more separate recipe programs include machine readable recipe program instructions configured to control functions of a particular multi-function cooking apparatus for sequentially executing food processing steps to prepare the one or more food products in accordance with the one or more separate recipe programs;

identifying, by a program analyzer component in accordance with predefined partitioning rules, subsets of recipe program instructions in the one or more recipe programs, wherein at least a first subset includes recipe program instructions for executing food processing steps with first compatible ingredient information, and at least a second subset includes recipe program instructions for executing food processing steps with second compatible ingredient information, wherein food processing steps are configured to be executed together or as a sequence based on a determined compatibility of ingredients;

generating a combined recipe program with recipe program instructions for all food processing steps associated with the one or more separate recipe programs wherein the combined recipe program has at least a first partition comprising the at least first subset, and has at least a second partition comprising the at least second subset; and providing the first and second partitions to the one or more multi-function cooking apparatuses for execution.

8. The method of claim 7, further comprising:

grouping recipe program instructions from at least two of the recipe programs according to temperature range, wherein the recipe program instructions of the at least first subset relate to food processing steps performed at one or more temperatures in a first temperature range, and wherein the recipe program instructions of the at least second subset relate to food processing steps performed at one or more temperatures in a second temperature range which is different from the first temperature range.

9. The method of claim 7, further comprising:

adding, in accordance with the predefined partitioning rules, one or more transitioning recipe instructions to the first or second partition, wherein a particular transitioning recipe instruction is determined based on a comparison of the one or more separate recipe programs with the partitions of the generated combined recipe program; and removing, in accordance with the predefined partitioning rules, one or more original separate recipe instructions from the first or second partition, wherein a particular original separate recipe instruction is determined based on a comparison of the one or more separate recipe programs with the partitions of the generated combined recipe program.

10. The method of claim 7, wherein the first and second partitions are provided to the particular multi-function cooking apparatus and the first partition is to be executed with at least a first heating-and-stirring element of the particular multi-function cooking apparatus, and the second partition is to be executed with at least a second heating-and-stirring element of the particular multi-function cooking apparatus.

11. The method of claim 7, wherein the first partition is provided to the particular multi-function cooking apparatus to be executed with at least a first heating-and-stirring element of the particular multi-function cooking apparatus, and the second partition is provided to a further multi-function cooking apparatus to be executed with at least a second heating-and-stirring element of the further multi-function cooking apparatus.

12. The method of claim 11, wherein the first partition includes recipe program instructions configured to complete processing of a particular food component before the execution of a further partition starts on the further multi-function cooking apparatus wherein the further multi-function cooking apparatus includes the particular food component as an input.

13. The method of claim 11, wherein the predefined partitioning rules further include rules to generate the partitions with regards to an improved synchronization of operating the at least two multi-function cooking apparatuses.

14. The method of claim 7, wherein the predefined partitioning rules include rules to re-arrange food processing steps so that the re-arranged food processing steps reduce aggregate energy consumption for the preparation of the one or more food products when operating the one or more multi-function cooking apparatuses at different temperatures.

15. The method of claim 7, wherein a particular partition includes recipe program instructions related to processing food components with the same ingredients.

16. A computer program product for partitioning machine readable recipe programs for one or more multi-function cooking apparatuses, the computer program product comprising computer readable instructions that when loaded into a memory of a computing device and executed by at least one processor of the computing device cause the computing device to:
receive, from a storage component, one or more separate recipe programs for preparing one or more food products, wherein the one or more separate recipe programs include machine readable recipe program instructions configured to control functions of a particular multi-function cooking apparatus for sequentially executing food processing steps to prepare the one or more food products in accordance with the one or more separate recipe programs;
identify, by a program analyzer component in accordance with predefined partitioning rules, subsets of recipe program instructions in the one or more recipe programs, wherein at least a first subset includes recipe program instructions for executing food processing steps with first compatible ingredient information, and at least a second subset includes recipe program instructions for executing food processing steps with second compatible ingredient information, wherein food processing steps are configured to be executed together or as a sequence based on a determined compatibility of ingredients;
generate a combined recipe program with recipe program instructions for all food processing steps associated with the one or more separate recipe programs wherein the combined recipe program has at least a first partition comprising the at least first subset, and has at least a second partition comprising the at least second subset; and
provide the first and second partitions to the one or more multi-function cooking apparatuses for execution.

17. The computer program product of claim 16, further comprising:
grouping recipe program instructions from at least two of the recipe programs according to temperature range, wherein the recipe program instructions of the at least first subset relate to food processing steps performed at one or more temperatures in a first temperature range, and wherein the recipe program instructions of the at least second subset relate to food processing steps performed at one or more temperatures in a second temperature range which is different from the first temperature range.

18. The computer program product of claim 16, wherein the first and second partitions are provided to the particular multi-function cooking apparatus and the first partition is to be executed with at least a first heating-and-stirring element of the particular multi-function cooking apparatus, and the second partition is to be executed with at least a second heating-and-stirring element of the particular multi-function cooking apparatus.

19. The computer program product of claim 16, wherein the first partition is provided to the particular multi-function cooking apparatus to be executed with at least a first heating-and-stirring element of the particular multi-function cooking apparatus, and the second partition is provided to a further multi-function cooking apparatus to be executed with at least a second heating-and-stirring element of the further multi-function cooking apparatus.

20. The computer program product of claim 16, wherein the predefined partitioning rules include rules to re-arrange food processing steps so that the re-arranged food processing steps reduce aggregate energy consumption for the preparation of the one or more food products when operating the one or more multi-function cooking apparatuses at different temperatures.

* * * * *

UNITED STATES PATENT AND TRADEMARK OFFICE
CERTIFICATE OF CORRECTION

| | | |
|---|---|---|
| PATENT NO. | : 10,360,812 B2 | Page 1 of 1 |
| APPLICATION NO. | : 15/645703 | |
| DATED | : July 23, 2019 | |
| INVENTOR(S) | : Koennings et al. | |

It is certified that error appears in the above-identified patent and that said Letters Patent is hereby corrected as shown below:

On the Title Page

Column 2, Item (74), in "Attorney, Agent, or Firm", Line 1, delete "Hughes &" and insert -- Hughes --, therefor.

Signed and Sealed this
Tenth Day of September, 2019

Andrei Iancu
*Director of the United States Patent and Trademark Office*